United States Patent
Anand et al.

(10) Patent No.: US 10,002,018 B2
(45) Date of Patent: Jun. 19, 2018

(54) MIGRATING SINGLE ROOT I/O VIRTUALIZATION ADAPTER CONFIGURATIONS IN A COMPUTING SYSTEM

(71) Applicant: International Business Machines Corporation, Armonk, NY (US)

(72) Inventors: Manu Anand, Hyderabad (IN); Jesse P. Arroyo, Rochester, MN (US); Charles S. Graham, Rochester, MN (US); Prathima Kommineni, Hyderabad (IN); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/050,669

(22) Filed: Feb. 23, 2016

(65) Prior Publication Data
US 2017/0242720 A1 Aug. 24, 2017

(51) Int. Cl.
*G06F 9/455* (2018.01)
*G06F 3/06* (2006.01)
*G06F 9/50* (2006.01)

(52) U.S. Cl.
CPC .......... *G06F 9/45558* (2013.01); *G06F 3/065* (2013.01); *G06F 3/0619* (2013.01);
(Continued)

(58) Field of Classification Search
None
See application file for complete search history.

(56) References Cited

U.S. PATENT DOCUMENTS 7,039,692 B2 5/2006 Foster et al.
7,209,994 B1 4/2007 Klaiber et al.
(Continued)

FOREIGN PATENT DOCUMENTS

CN 101488092 A 7/2009
CN 104737138 A 6/2015
(Continued)

OTHER PUBLICATIONS

Ajila et al., "Efficient Live Wide Area VM Migration With IP Address Change Using Type II Hypervisor", 2013 IEEE 14th International Conference on Information Reuse and Integration (IRI2013), Aug. 2013, pp. 372-379, IEEE Xplore Digital Library (online), DOI: 10.1109/IRI.2013.6642495.
(Continued)

*Primary Examiner* — Sisley Kim
(74) *Attorney, Agent, or Firm* — Brandon C. Kennedy; Robert R. Williams; Kennedy Lenart Spraggins LLP (57) ABSTRACT

A computing environment includes a computing system, where the computing system includes a plurality of logical partitions, a hypervisor supporting the plurality of logical partitions, a plurality of SR-IOV adapters, where at least one of the logical partitions is mapped to a virtual function on a first SR-IOV adapter of the plurality of adapters, and where migrating an SR-IOV adapter configuration in the computing environment includes: cloning, on a second SR-IOV adapter, a configuration of the first SR-IOV adapter; placing the second SR-IOV adapter and the virtual function in an error state; remapping the virtual function from the first SR-IOV adapter to the second SR-IOV adapter; and placing the second SR-IOV adapter and the virtual function in an error recovery state.

20 Claims, 8 Drawing Sheets

(52) U.S. Cl.
CPC .......... *G06F 3/0679* (2013.01); *G06F 9/5077* (2013.01); *G06F 2009/4557* (2013.01); *G06F 2009/45562* (2013.01); *G06F 2009/45579* (2013.01)

(56) References Cited

U.S. PATENT DOCUMENTS

| | | |
|---|---|---|
| 7,240,364 B1 | 7/2007 | Branscomb et al. |
| 7,574,537 B2 | 8/2009 | Arndt et al. |
| 7,613,898 B2 | 11/2009 | Haertel et al. |
| 7,734,843 B2 | 6/2010 | Bender et al. |
| 7,813,366 B2 | 10/2010 | Freimuth et al. |
| 7,882,326 B2 | 2/2011 | Armstrong et al. |
| 7,937,518 B2 | 5/2011 | Boyd et al. |
| 7,984,262 B2 | 7/2011 | Battista et al. |
| 8,219,988 B2 | 7/2012 | Armstrong et al. |
| 8,321,722 B2 | 11/2012 | Tanaka et al. |
| 8,327,086 B2 | 12/2012 | Jacobs et al. |
| 8,429,446 B2 | 4/2013 | Hara et al. |
| 8,533,713 B2 | 9/2013 | Dong |
| 8,561,065 B2 | 10/2013 | Cunningham et al. |
| 8,561,066 B2 | 10/2013 | Koch et al. |
| 8,607,230 B2 | 12/2013 | Hatta et al. |
| 8,621,120 B2 | 12/2013 | Bender et al. |
| 8,645,755 B2 | 2/2014 | Brownlow et al. |
| 8,677,356 B2 | 3/2014 | Jacobs et al. |
| 8,683,109 B2 | 3/2014 | Nakayama et al. |
| 8,875,124 B2 | 10/2014 | Kuzmack et al. |
| 8,984,240 B2 | 3/2015 | Aslot et al. |
| 9,032,122 B2 | 5/2015 | Hart et al. |
| 9,047,113 B2 | 6/2015 | Iwamatsu et al. |
| 9,304,849 B2 | 4/2016 | Arroyo et al. |
| 9,317,317 B2 | 4/2016 | Graham et al. |
| 9,473,400 B1 | 10/2016 | DeVilbiss et al. |
| 9,501,308 B2 | 11/2016 | Arroyo et al. |
| 9,552,233 B1 | 1/2017 | Tsirkin et al. |
| 9,715,469 B1 | 7/2017 | Arroyo et al. |
| 9,720,862 B1 | 8/2017 | Arroyo et al. |
| 9,720,863 B1 | 8/2017 | Arroyo et al. |
| 9,740,647 B1 | 8/2017 | Arroyo et al. |
| 9,760,512 B1 | 9/2017 | Arroyo et al. |
| 9,785,451 B1 | 10/2017 | Arroyo et al. |
| 2002/0083258 A1 | 6/2002 | Bauman et al. |
| 2003/0050990 A1 | 3/2003 | Craddock et al. |
| 2003/0101377 A1 | 5/2003 | Dawkins et al. |
| 2003/0204648 A1 | 10/2003 | Arndt |
| 2004/0064601 A1 | 4/2004 | Swanberg |
| 2004/0205272 A1 | 10/2004 | Armstrong et al. |
| 2004/0243994 A1 | 12/2004 | Nasu |
| 2006/0095624 A1 | 5/2006 | Raj et al. |
| 2006/0179177 A1 | 8/2006 | Arndt et al. |
| 2006/0195618 A1 | 8/2006 | Arndt et al. |
| 2006/0195620 A1 | 8/2006 | Arndt et al. |
| 2006/0281630 A1 | 12/2006 | Bailey et al. |
| 2007/0157197 A1 | 7/2007 | Neiger et al. |
| 2007/0260768 A1 | 11/2007 | Bender et al. |
| 2008/0005383 A1 | 1/2008 | Bender et al. |
| 2008/0114916 A1 | 5/2008 | Hummel et al. |
| 2008/0147887 A1 | 6/2008 | Freimuth et al. |
| 2009/0007121 A1 | 1/2009 | Yamada et al. |
| 2009/0083467 A1 | 3/2009 | Giles et al. |
| 2009/0133016 A1 | 5/2009 | Brown et al. |
| 2009/0133028 A1 | 5/2009 | Brown et al. |
| 2009/0249366 A1 | 10/2009 | Sen et al. |
| 2009/0276551 A1 | 11/2009 | Brown et al. |
| 2009/0276773 A1 | 11/2009 | Brown et al. |
| 2010/0036995 A1 | 2/2010 | Nakayama et al. |
| 2010/0250824 A1 | 9/2010 | Belay |
| 2010/0262727 A1 | 10/2010 | Arndt |
| 2011/0197003 A1 | 8/2011 | Serebrin et al. |
| 2011/0320860 A1 | 12/2011 | Coneski et al. |
| 2012/0042034 A1 | 2/2012 | Goggin et al. |
| 2012/0131232 A1 | 5/2012 | Brownlow et al. |
| 2012/0131576 A1 | 5/2012 | Hatta et al. |
| 2012/0137288 A1 | 5/2012 | Barrett et al. |
| 2012/0137292 A1 | 5/2012 | Iwamatsu et al. |
| 2012/0151473 A1 | 6/2012 | Koch et al. |
| 2012/0167082 A1 | 6/2012 | Kumar et al. |
| 2012/0179932 A1 | 7/2012 | Armstrong et al. |
| 2012/0191935 A1 | 7/2012 | Oberly, III et al. |
| 2012/0198187 A1 | 8/2012 | Accapadi et al. |
| 2012/0246644 A1 | 9/2012 | Hattori et al. |
| 2012/0265910 A1 | 10/2012 | Galles et al. |
| 2012/0297379 A1 | 11/2012 | Anderson et al. |
| 2012/0303594 A1 | 11/2012 | Mewhinney et al. |
| 2013/0086298 A1* | 4/2013 | Alanis .................. G06F 9/4856 711/6 |
| 2013/0159572 A1 | 6/2013 | Graham et al. |
| 2013/0160002 A1 | 6/2013 | Graham et al. |
| 2013/0191821 A1 | 7/2013 | Armstrong et al. |
| 2013/0268800 A1 | 10/2013 | Rangaiah |
| 2014/0122760 A1 | 5/2014 | Grisenthwaite et al. |
| 2014/0149985 A1 | 5/2014 | Takeuchi |
| 2014/0181801 A1 | 6/2014 | Voronkov et al. |
| 2014/0245296 A1 | 8/2014 | Sethuramalingam et al. |
| 2014/0258570 A1 | 9/2014 | Eide et al. |
| 2014/0281263 A1 | 9/2014 | Deming et al. |
| 2014/0351471 A1 | 11/2014 | Jebson et al. |
| 2014/0372739 A1 | 12/2014 | Arroyo et al. |
| 2014/0372789 A1 | 12/2014 | Arroyo et al. |
| 2014/0372795 A1 | 12/2014 | Graham et al. |
| 2014/0372801 A1 | 12/2014 | Graham et al. |
| 2015/0006846 A1 | 1/2015 | Youngworth |
| 2015/0052282 A1* | 2/2015 | Dong .................. G06F 13/32 710/308 |
| 2015/0120969 A1 | 4/2015 | He et al. |
| 2015/0193248 A1 | 7/2015 | Noel et al. |
| 2015/0193250 A1 | 7/2015 | Ito et al. |
| 2015/0229524 A1 | 8/2015 | Engebretsen et al. |
| 2015/0301844 A1 | 10/2015 | Droux et al. |
| 2015/0317274 A1 | 11/2015 | Arroyo et al. |
| 2015/0317275 A1 | 11/2015 | Arroyo et al. |
| 2016/0019078 A1 | 1/2016 | Challa et al. |
| 2016/0246540 A1 | 8/2016 | Blagodurov et al. |
| 2016/0350097 A1 | 12/2016 | Mahapatra et al. |
| 2017/0046184 A1 | 2/2017 | Tsirkin et al. |
| 2017/0199768 A1 | 7/2017 | Arroyo et al. |
| 2017/0242720 A1 | 8/2017 | Anand et al. |
| 2017/0242756 A1 | 8/2017 | Arroyo et al. |
| 2017/0242763 A1 | 8/2017 | Arroyo et al. |

FOREIGN PATENT DOCUMENTS

| | | |
|---|---|---|
| JP | 2012-113660 A | 6/2012 |
| JP | 5001818 B | 8/2012 |

OTHER PUBLICATIONS

PCI-SIG, "Single Root I/O Virtualization and Sharing Specification—Revision 1.0", Sep. 2007, PCI-SIG Specifications Library, pcisig.com (online), URL: pcisig.com/specifications/iov/single_root/.

Challa, "Hardware Based I/O Virtualization Technologies for Hypervisors, Configurations and Advantages—A Study", 2012 IEEE International Conference on Cloud Computing in Emerging Markets (CCEM), Oct. 2012, pp. 99-103, IEEE Xplore Digital Library (online), DOI: 10.1109/CCEM.2012.6354610.

Xu et al., "Multi-Root I/O Virtualization Based Redundant Systems", 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS.2014.7044652.

Appendix P; List of IBM Patent or Applications Treated as Related, Jan. 4, 2017, 2 pages.

Axnix et al. "IBM z13 firmware innovations for simultaneous multithreading and I/O virtualization", IBM Journal of Research and Development, Jul./Sep. 2015, vol. 59, No. 4/5, 11-1, International Business Machines Corporation (IBM), Armonk, NY.

Salapura et al., "Resilient cloud computing", IBM Journal of Research and Development, Sep./Oct. 2013, vol. 57, No. 5, 10-1, International Business Machines Corporation (IBM), Armonk, NY.

(56) References Cited

OTHER PUBLICATIONS

Xu et al., *SRVM: Hypervisor Support for Live Migration with Passthrough SR-IOV Network Devices*, Proceedings of the 12th ACM SIGPLAN/SIGOPS International Conference on Virtual Execution Environments (VEE'16), Apr. 2016, pp. 65-77, ACM New York, NY, USA.
Huang et al., *Nomad: Migrating OS-bypass Networks in Virtual Machines*, Proceedings of the 3rd International Conference on Virtual Execution Environments (VEE'07), Jun. 2007, pp. 158-168, ACM New York, NY, USA.
Appendix P; List of IBM Patent or Applications Treated as Related, May 26, 2017, 2 pages.
Oracle, *Updating the Universal HBA Firmware*, Oracle Docs, dated Sep. 15, 2013, docs.oracle.com/cd/E24650_01/html/E24461/z40004591045586.html. Accessed Oct. 23, 2017. 4 pages.
Lynch, *Live Partition Mobility*, Forsythe, Nov. 11, 2014, 30 pages.
U.S. Appl. No. 15/806,590, to Jesse P. Arroyo et al., entitled, Migrating MMIO From a Source I/O Adapter of a Source Computing System to a Destination I/O Adapter of a Destination Computing System, assigned to International Business Machines Corporation, 38 pages, filed Nov. 8, 2017.
U.S. Appl. No. 15/807,638, to Jesse P. Arroyo et al., entitled, Migrating Interrupts From a Source I/O Adapter of a Computing System to a Destination I/O Adapter of the Computing System, assigned to International Business Machines Corporation, 28 pages, filed Nov. 8, 2017.
Appendix P; List of IBM Patent or Applications Treated as Related, Jan. 12, 2018, 2 pages.
U.S. Appl. No. 15/299,512, to Jesse P. Arroyo et al., entitled, Migrating MMIO From a Source I/O Adapter of a Computing System to a Destination I/O Adapter of the Computing System, assigned to International Business Machines Corporation, 35 pages, filed Oct. 21, 2016.
U.S. Appl. No. 15/467,183, to Jesse P. Arroyo et al., entitled, Migrating Interrupts From a Source I/O Adapter of a Computing System to a Destination I/O Adapter of the Computing System, assigned to International Business Machines Corporation, 35 pages, filed Mar. 23, 2017.
U.S. Appl. No. 15/467,025, to Jesse P. Arroyo et al., entitled, Migrating Interrupts From a Source I/O Adapter of a Source Computing System to a Destination I/O Adapter of a Destination Computing System assigned to International Business Machines Corporation, 38 pages, filed Mar. 23, 2017.
U.S. Appl. No. 15/467,052, to Jesse P. Arroyo et al., entitled, Migrating MMIO From a Source I/O Adapter of a Source Computing System to a Destination I/O Adapter of a Destination Computing System, assigned to International Business Machines Corporation, 38 pages, filed Mar. 23, 2017.
U.S. Appl. No. 15/617,170, to Jesse P. Arroyo et al., entitled, Migrating MMIO From a Source I/O Adapter of a Computing System to a Destination I/O Adapter of the Computing System, assigned to International Business Machines Corporation, 36 pages, filed Jun. 8, 2017.

* cited by examiner

MIGRATING SINGLE ROOT I/O
VIRTUALIZATION ADAPTER
CONFIGURATIONS IN A COMPUTING
SYSTEM

BACKGROUND

Field of the Invention

The field of the invention is data processing, or, more specifically, methods, apparatus, and computer program products for migrating a single root input/output virtualization (SR-IOV) adapter configuration in a computing environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancement includes data centers providing cloud services with various types of virtualization services. Regardless of the particular type of virtualization service being offered, most virtualization services make use of massive amounts of data I/O traffic and network bandwidth. In such a computing environment, an industry standard specification, SR-IOV, exists for creating virtual processes that allow for independent access to I/O hardware resources of a shared network device. However, problems still exist in reducing the impact from hardware failures or updates on the hardware being utilized by the virtualization services.

SUMMARY

Disclosed are embodiments for migrating an SR-IOV adapter configuration in a computing system. One embodiment includes a computing system that includes a plurality of logical partitions, a hypervisor supporting the plurality of logical partitions, a plurality of SR-IOV adapters, where at least one of the logical partitions is mapped to a virtual function on a first SR-IOV adapter of the plurality of adapters, and where a method for migrating an SR-IOV adapter configuration in a computing environment includes: cloning, on a second SR-IOV adapter, a configuration of the first SR-IOV adapter; placing the second SR-IOV adapter and the virtual function in an error state; remapping the virtual function from the first SR-IOV adapter to the second SR-IOV adapter; and placing the second SR-IOV adapter and the virtual function in an error recovery state.

The foregoing and other features, aspects, and details are described in the Detailed Description, and are illustrated in the accompanying drawings, where like reference numbers generally represent like parts of the disclosed embodiments.

DETAILED DESCRIPTION

Embodiments of methods, apparatus, and computer program products for migrating a single root input/output virtualization (SR-IOV) adapter configurations in a computing system are described with reference to the accompanying drawings, beginning with FIG. 1. The example of FIG. 1 includes a data center (120). Such a data center may provide clients on host devices (195) with virtualization services for enabling various cloud related product offerings.

Figure 1:
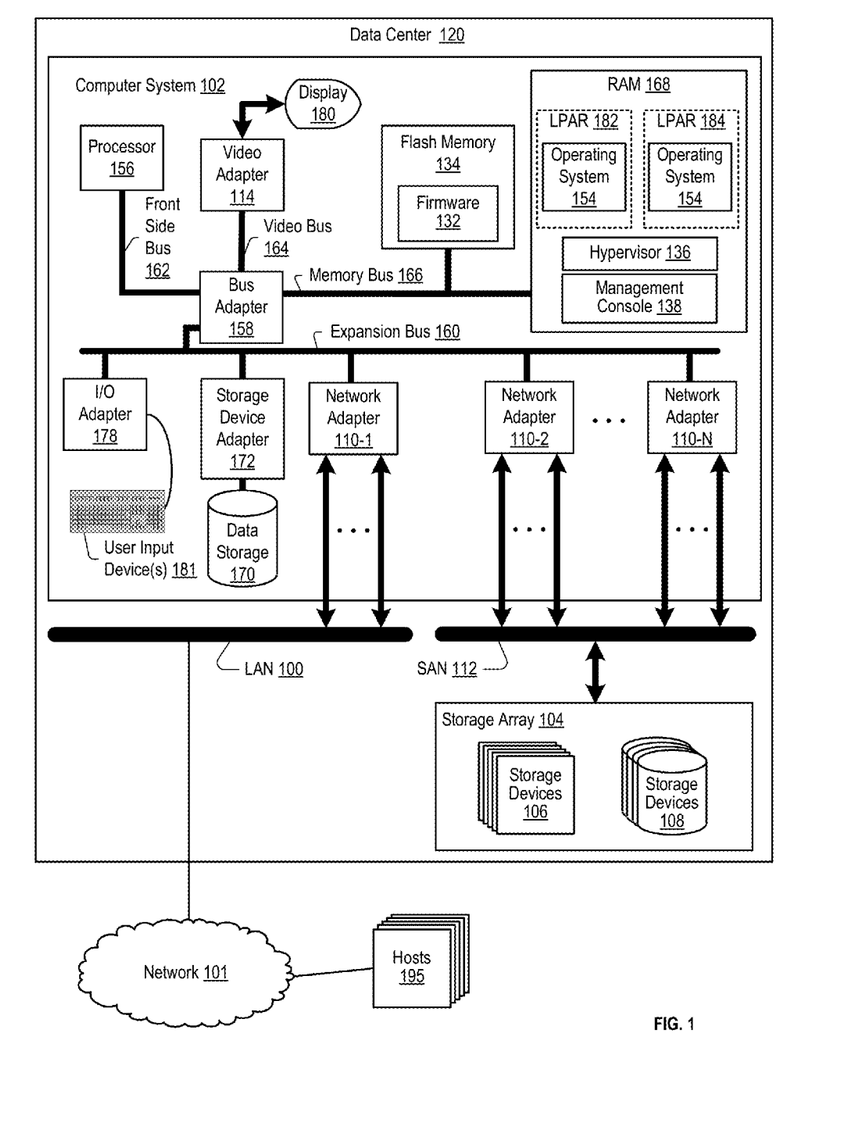
FIG. 1 illustrates a computer system configured for migrating an SR-IOV adapter configuration in a computing environment according to an embodiment.

The example data center (120) of FIG. 1 also includes automated computing machinery in the form of a computer system (102) configured for migrating an SR-IOV adapter configuration. SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition instantiated by a hypervisor, a VF appears as a fully functional physical PCIe adapter. In this way, a single physical adapter may be 'shared' amongst many logical partitions (182,184) or multiple virtual functions may be instantiated for use by a single logical partition.

The computer system (102) includes at least one computer processor (156) or "CPU" as well as random access memory (168) or "RAM," which is connected through a high speed memory bus (166) and bus adapter (158) to processor (156) and to other components of the computer system (102).

Stored in RAM (168) is a hypervisor (136) and a management console (138). The management console (138) may provide a user interface through which a user may direct the hypervisor (136) on instantiating and maintaining multiple logical partitions (182,184), where each logical partition may provide virtualization services to one or more clients. Although management console (138) is depicted in RAM (168) of the computer system (102), readers of skill in the art will recognize that such a management console may also be implemented in a different system entirely. As explained below in greater detail, the hypervisor and management console may be configured to migrate an SR-IOV adapter configuration according to various embodiments. The management console (138) for example may, when executed, cause the hypervisor (136) to carry out the steps of: cloning, on a second SR-IOV adapter, a configuration of a first SR-IOV adapter; placing the second SR-IOV adapter and the virtual function in an error state; remapping the virtual function from the first SR-IOV adapter to the second SR-IOV adapter; and placing the second SR-IOV adapter and the virtual function in an error recovery state.

Also stored in RAM (168) is an operating system (154) for each of the logical partitions (182, 184). Operating systems useful in computers configured for migrating an SR-IOV adapter configuration in a computing environment according to various embodiments include UNIX, Linux, Microsoft XP™, AIX™, IBM's i™ operating system, and others as will occur to those of skill in the art. The operating system (154), hypervisor (136), and management console (138) are shown in RAM (168), but many components of such software may typically be stored in non-volatile memory such as, for example, on a data storage (170) device or in firmware (132).

The computer system (102) may also include a storage device adapter (172) coupled through expansion bus (160) and bus adapter (158) to processor (156) and other components of the computer system (102). Storage device adapter (172) connects non-volatile data storage to the computer system (102) in the form of data storage (170). Storage device adapters useful in computers configured for migrating an SR-IOV adapter configuration according to various embodiments include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computer system (104) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computer system (102) of FIG. 1 also includes several I/O adapters which may be implemented as SR-IOV adapters in the form of network adapters (110-1-110-N). Any of the example network adapters from among network adapters (110-1-110-N) may be configured to support SR-IOV and provide multiple virtual functions, where each of the virtual functions may be mapped to a respective logical partition. In this way, each of the logical partitions may independently use a physical network adapter that is being shared among different logical partitions. Such network adapters may also be configured for data communications with other computers or devices (not shown) and for data communications with a data communications network. Such data communications may be carried out serially through RS-232 connections, through external buses such as a Universal Serial Bus ("USB"), through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for migrating an SR-IOV adapter configuration in a computing environment according to various embodiments include modems for wired dial-up communications, Ethernet (IEEE 802.3) adapters for wired data communications, and 802.11 adapters for wireless data communications.

The network adapters (110-1-110-N) may further be configured for data communications with hosts (195) over a network (101) reachable through local area networks (LANs), such as LAN (100). The network adapters (110-1-110-N) may further be configured for data communications with storage area networks (SANs), such as SAN (112), and for data communications with various storage devices, such as storage devices (106) and storage devices (108).

From time to time and for various reasons, an adapter may be scheduled to be taken offline. SR-IOV adapters, such as the network adapters (110-1-110-N), when taken offline, may cause many disruptions due to the virtualized connection provide to logical partitions. To that end, the computer system (102) of FIG. 1 may be configured to migrate an SR-IOV adapter configuration.

In an embodiment, the management console (138) may be implemented within the hypervisor (136), and the management console (138) may configure SR-IOV adapters and mappings between logical partitions and virtual functions executing on a respective SR-IOV adapter. Further, the management console (138) may, through a user interface, receive commands for: performing software or firmware updates to SR-IOV adapters, or other network hardware; adding, removing, or reconfiguring SR-IOV adapters; performing maintenance tasks; or, generally, any administrative commands with regard to the virtual processes and hardware devices of the data center (120). In an embodiment, the management console (138) may be implemented on a different computer system than the computer system implementing the hypervisor (136). The hypervisor (136) may provide the management console as an interface for configuring the hypervisor (136), including scheduling updates, configuring logical partitions, and other system administration functions. For example, the management console may provide a user interface for assigning, or mapping, virtual functions on a given network adapter to given logical partitions.

A network adapter, such as network adapter (110-1), may be implemented as a network card installed within a PCIe slot on a circuit board of the computer system (102). Further, a given network adapter may be due for maintenance, upgrades, or may fail. In such cases, the network adapter may be offline for some period of time, which is undesirable from a customer perspective.

The hypervisor (136), to reduce downtime for a network adapter, may migrate an SR-IOV adapter configuration in a computing environment from a first SR-IOV adapter to a second SR-IOV adapter, and migrating virtual functions running on the first SR-IOV adapter to run on the second SR-IOV adapter. The hypervisor may carry out such migration by: cloning, on a second SR-IOV adapter, a configuration of the first SR-IOV adapter; placing the second SR-IOV adapter and the virtual function in an error state; remapping the virtual function from the first SR-IOV adapter to the second SR-IOV adapter; and placing the second SR-IOV adapter and the virtual function in an error recovery state.

In addition to reducing downtown, the migration of an SR-IOV adapter from a source to a target may also enable a change in functionality or capacity. A user, for example, may request that a particular virtual function on a source adapter be expanded or reduced in functionality or capacity. To that end, the target adapter may be instructed to instantiate a virtual function that is of the requested functionality or capacity. Then, when the logical partition is remapped from the source to the target adapter, the virtual function mapped to the logical partition will be of different functionality or capacity than the original virtual function of the source adapter mapped to the logical partition prior to the migration.

Further, the operations related to migrating from a first SR-IOV adapter to a second SR-IOV adapter may be performed concurrent with normal I/O operations performed on the logical partition mapped to the first SR-IOV adapter. In effect, from the perspective of a logical partition utilizing a VF of the first SR-IOV adapter (the adapter for which the configuration is migrated to a second SR-IOV adapter), the adapter instantiated for use by the logical partition will experience a short error period and then regain functionality. The logical partition is unaware that the adapter configuration has been cloned to a second adapter and the logical partitions' VF is now supported by a different adapter after the error period.

While in this disclosure, the embodiments are described in the context of the SR-IOV standard and PCIe, such descriptions are intended to be illustrative, not limiting. In general, the disclosed embodiments for migrating network adapter or network device configurations used by a virtual process using a particular hardware resource to the virtual process using a different hardware resource of a network adapter or device is possible using other virtualization standards, or no standard at all. In other words, in general, a hypervisor may suspending operation of an initial hardware device being used by a logical partition, and while the hardware device is suspended, the hypervisor may migrate functionality of the suspended hardware device to another hardware device and also remap interrupts and other parameters such that when the hypervisor ends the suspended state, the logical partition uses the functionality of the other hardware device instead of the initial hardware device where the processes of the logical partition need not be aware of any remapping or migration of functionality from the initial hardware device to the other hardware device.

The network adapters (110-1-110-N) are for purposes of illustration, not for limitation. Similarly, data centers according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

Figure 2:
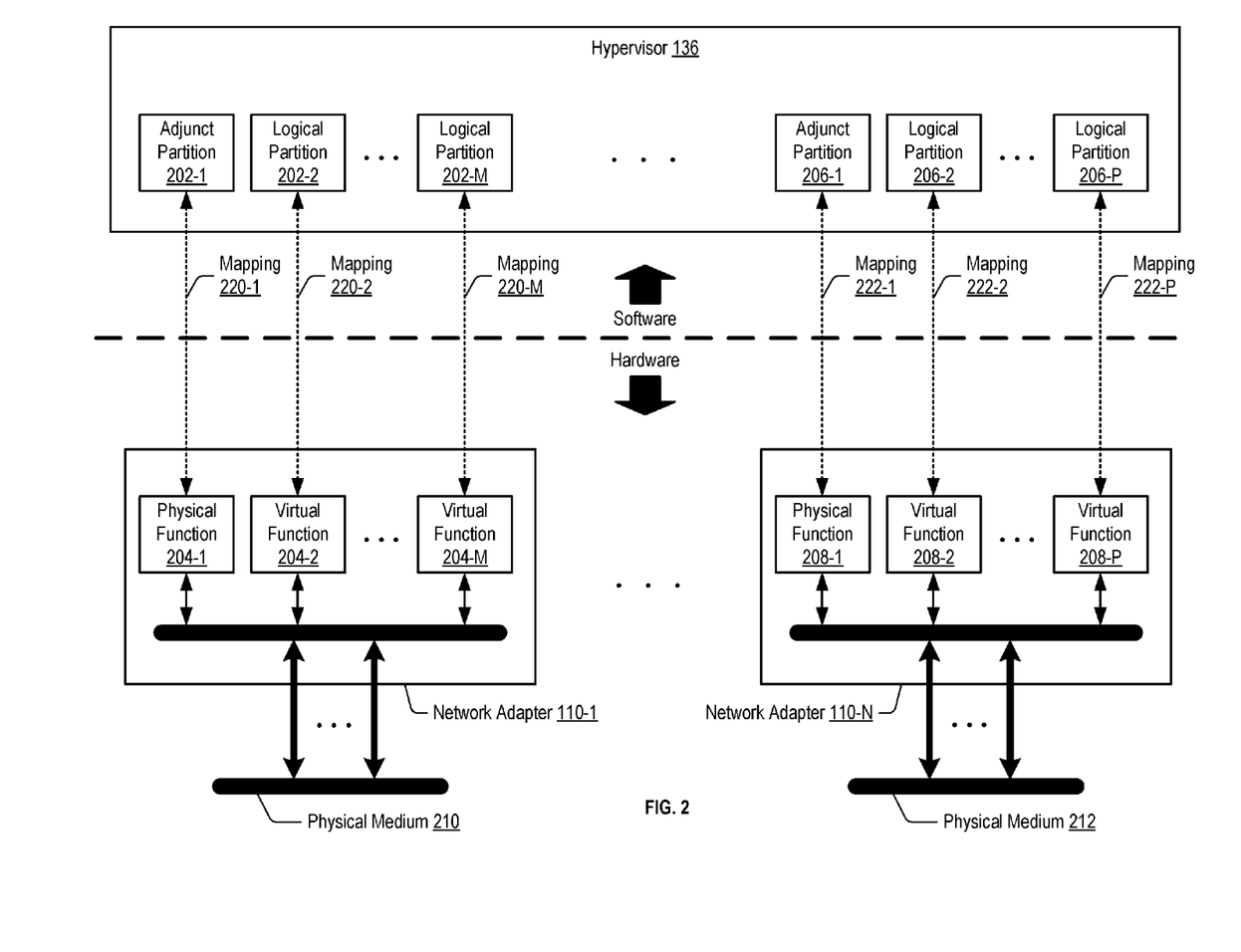
FIG. 2 illustrates a mapping of logical partitions to virtual functions in a network adapter according to an embodiment for migrating an SR-IOV adapter configuration in a computing environment.

Turning to FIG. 2, illustrated are example mappings between logical partitions and virtual functions implemented within respective network adapters. As depicted, hypervisor (136) is in communication with network adapters (110-1-110-N), where network adapter (110-1) is coupled to a physical medium (210), and where network adapter (110-N) is coupled to another physical medium (212).

The network adapter (110-1) may include a physical function, such as physical function (204-1), where the physical function (204-1) may be the primary function of the network adapter (110-1) and may advertise SR-IOV capabilities and configure the network adapter (110-1). The network adapter (110-1) may include a physical function (204-1) that is associated, or mapped, to a parent partition or an adjunct partition. An adjunct function within the hypervisor (136) may be a logical partition that is further configured to request configuration information from the network adapter (110-1), or to specify parameters or define configuration information for the network adapter (110-1). Such an adjunct partition is generally not utilized in user-space.

The network adapter (110-1) may also include several virtual functions, where a given virtual function may share one or more physical resources of the network adapter (110-1) in a virtualized environment.

In this embodiment, adjunct partition (202-1) is mapped to physical function (204-1), as depicted by mapping (220-1); logical partition (202-2) is mapped to virtual function (204-2), as depicted by mapping (220-2); logical partition (202-M) is mapped to virtual function (204-M), as depicted by mapping (220-M); adjunct partition (206-1) is mapped to physical function (208-1), as depicted by mapping (222-1); logical partition (206-2) is mapped to virtual function (208-2), as depicted by mapping (222-2); and logical partition (206-P) is mapped to virtual function (208-P), as depicted by mapping (222-P).

A mapping may include: information for identifying a PCIe slot for the network adapter for a virtual function; specifications of direct memory access (DMA) memory space; mappings for memory mapped input output (MMIO); among other configurations or settings that enable a given logical partition to communicate and use physical resources by interfacing with a given virtual function on a network adapter.

Figure 3:
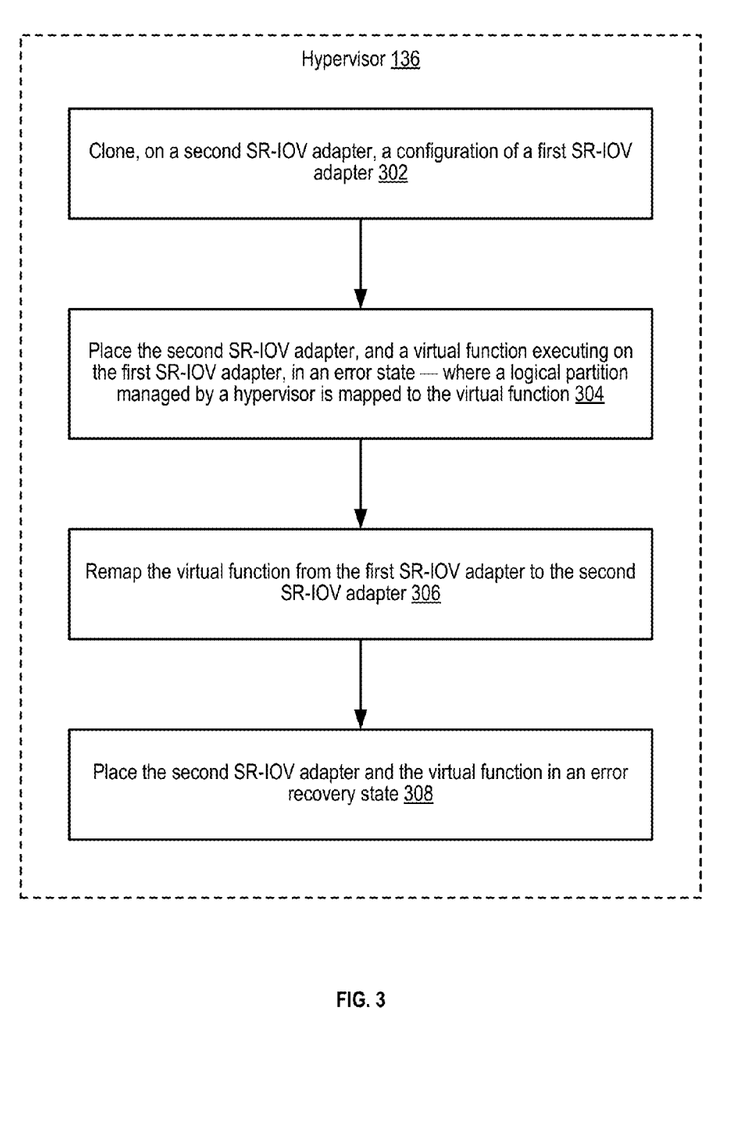
FIG. 3 depicts a flow chart illustrating an embodiment of a method for migrating an SR-IOV adapter configuration in a computing environment.

Turning to FIG. 3, depicted is a flow chart illustrating an embodiment of a method for migrating an SR-IOV adapter configuration in a computing environment. The method of FIG. 3 may be carried out by a management console (138) and a hypervisor (136) executing within a computer system (102).

One embodiment includes a computing system (102) that includes a plurality of logical partitions (202-1-202-M . . . 206-1-206-P), a hypervisor (136) supporting the plurality of logical partitions, a plurality of SR-IOV adapters (110-1-110-M), where at least one of the logical partitions is mapped to a virtual function on a first SR-IOV adapter of the plurality of adapters, and where a method for migrating an SR-IOV adapter configuration in a computing environment includes: cloning (302), on a second SR-IOV adapter, a configuration of the first SR-IOV adapter; placing (304) the second SR-IOV adapter and the virtual function in an error state; remapping (306) the virtual function from the first SR-IOV adapter to the second SR-IOV adapter; and placing (308) the second SR-IOV adapter and the virtual function in an error recovery state.

Cloning (302), on a second SR-IOV adapter, a configuration of a first SR-IOV adapter may be carried out by the hypervisor (136) copying configuration information specifying the first SR-IOV adapter onto the second SR-IOV adapter. For example, the hypervisor (136) may obtain configuration information for the first SR-IOV adapter from stored, non-volatile memory. In other cases, the hypervisor (136) may query, via an adjunct partition mapped to a physical function on the first SR-IOV adapter, configuration information for the first SR-IOV adapter. Given the configuration information from the first SR-IOV adapter, the hypervisor may define, via an adjunct partition mapped to a physical function on the second SR-IOV adapter, the configuration information for the second SR-IOV adapter.

These cloning operations may be performed while the first SR-IOV adapter is functioning and handling I/O operations from the logical partitions mapped to the virtual functions on the first SR-IOV adapter. Further, during this cloning process, any modifications received that are directed to the first SR-IOV adapter may also be applied to the second SR-IOV adapter. Subsequent to cloning, the second SR-IOV adapter may be ready for operation, and at this point, operation on the first SR-IOV adapter may be suspended so that the virtual function may be remapped to the second SR-IOV adapter. In this way, after the virtual function in remapped, when the logical partition and the virtual function resume from their suspended state, the logical partition may communicate with the virtual function operating on the second SR-IOV adapter.

In an embodiment, the hypervisor (136), or an adjunct partition created and associated with a physical function on the second SR-IOV adapter, may create a physical function driver process for creating, or migrating, virtual functions from the first SR-IOV adapter.

In an embodiment, the hypervisor (136) may migrate all virtual functions from one SR-IOV adapter to a single other SR-IOV adapter. However, in other embodiments, the hypervisor (136) may migrate all the running virtual function on an initial SR-IOV adapter, and migrate different virtual functions of all the running virtual functions onto different target SR-IOV adapters. For example, an initial SR-IOV adapter may have 64 running virtual functions, and if the initial SR-IOV adapter needed to be updated or otherwise taken offline, the hypervisor (136) may identify a set of SR-IOV adapters with capacity to run virtual functions. In this case, the hypervisor (136) may then migrate a first group of the virtual functions running on the initial SR-IOV adapter onto a first target SR-IOV adapter of the identified set of SR-IOV adapters, a second group of the virtual functions running on the initial SR-IOV adapter onto a second target SR-IOV adapter of the identified set of SR-IOV adapter, and so on, until all virtual functions of the initial SR-IOV adapter are remapped onto different ones of the identified set of SR-IOV adapters.

Placing (304) the second SR-IOV adapter, and the virtual function, in the error state may be carried out by the hypervisor (136) generating an interrupt to inform both the logical partition and the virtual function to enter into an error state, and to suspend operation. In this example, the logical partition may include a device driver that communicates with the virtual function, and the device driver is the process within the logical partition that enters an error state where the remaining processes in the logical partition may continue executing. In PCIe embodiments, the error state may be the EEH (enhanced I/O error handling) state.

Remapping (306) the virtual function from the first SR-IOV adapter to the second SR-IOV adapter may be carried out by the hypervisor (136), and may be performed after the virtual function and the second SR-IOV adapter have entered the error state.

In this example, remapping (306) may be carried out by: updating information for identifying a PCIe slot for the network adapter for a virtual function, in this case, from the first SR-IOV adapter to the second SR-IOV adapter; updating specifications of direct memory access (DMA) memory space from the first SR-IOV adapter to the second SR-IOV adapter; updating mappings for memory mapped input output (MMIO) from the first SR-IOV adapter to the second SR-IOV adapter.

Generally, remapping (306) may include updating any configurations or settings that enable a given logical partition to communicate and use physical resources by interfacing with a given virtual function on a given network adapter. After the remapping is complete, the hypervisor may proceed to resuming operation of the virtual function, where the virtual function will resume execution from the second SR-IOV adapter.

Placing (308) the second SR-IOV adapter and the virtual function in an error recovery state may be carried out by the hypervisor (136), and may include the hypervisor (136) generating an interrupt to indicate initiation of an error recovery. In this example, given that the virtual function has been remapped to the second SR-IOV adapter from the first SR-IOV adapter, when the logical partition exits the error recovery state, the logical partition may again communicate with the virtual function where the virtual function executes from the second SR-IOV adapter when the virtual function resumes from the error recovery state.

In an embodiment, the logical partition may not be aware of any remapping, and from the perspective of the logical partition, the virtual function appears unchanged from the period before the error state to the period subsequent from recovering from the error state. In this way, no changes within the logical partition are needed during a migration of the virtual function from the first SR-IOV adapter to the second SR-IOV adapter.

Figure 4:
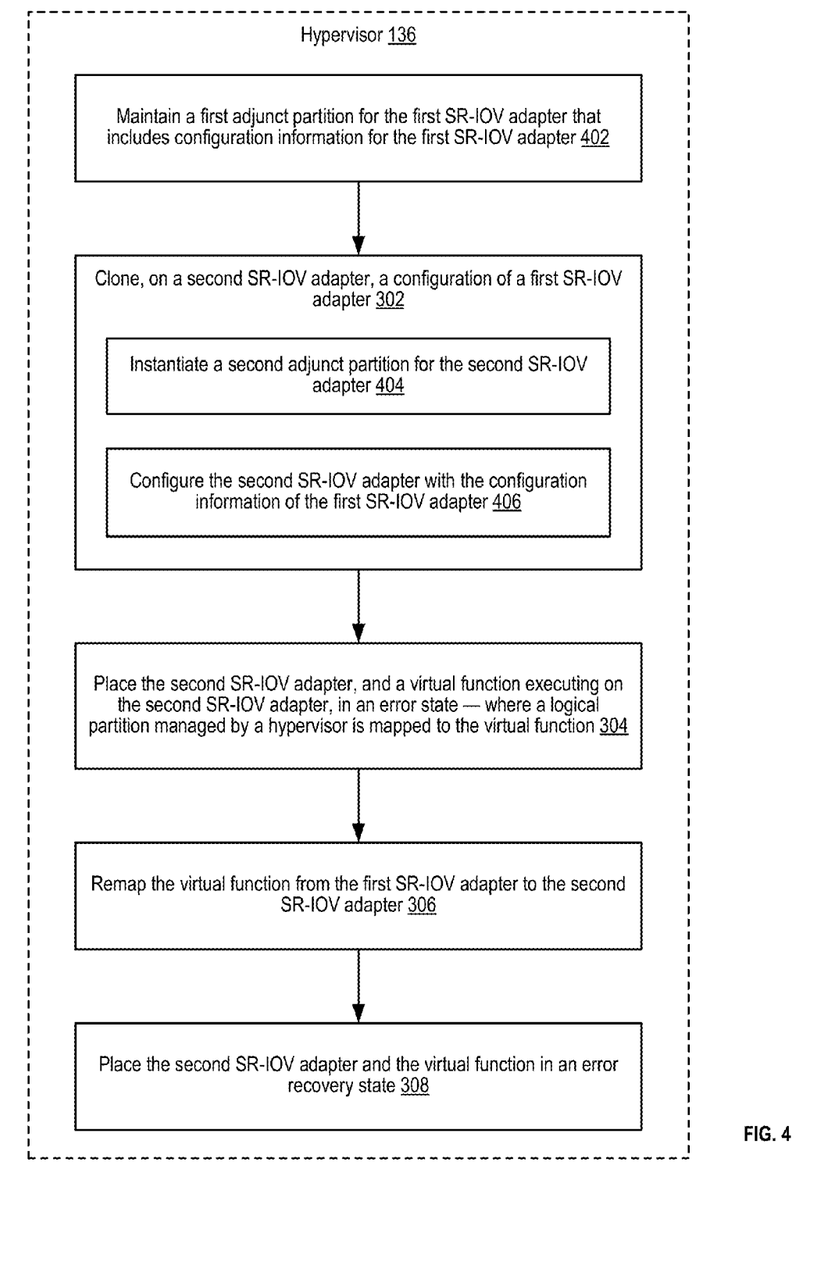
FIG. 4 depicts a flow chart illustrating an embodiment of a method for migrating an SR-IOV adapter configuration in a computing environment.

Turning to FIG. 4, the method of FIG. 4 is similar to the method of FIG. 3 in that the method of FIG. 3 includes: cloning (302), on a second SR-IOV adapter, a configuration of the first SR-IOV adapter; placing (304) the second SR-IOV adapter and the virtual function in an error state; remapping (306) the virtual function from the first SR-IOV adapter to the second SR-IOV adapter; and placing (308) the second SR-IOV adapter and the virtual function in an error recovery state.

However, the method of FIG. 4 differs from the method of FIG. 3 in that the method of FIG. 4 includes: maintaining (402) a first adjunct partition for the first SR-IOV adapter that includes configuration information for the first SR-IOV adapter, and where cloning (302), on the second SR-IOV adapter, the configuration of the first SR-IOV adapter further includes: instantiating (404) a second adjunct partition for the second SR-IOV adapter, and configuring (406) the second SR-IOV adapter with the configuration of the first SR-IOV adapter.

Maintaining (402) a first adjunct partition for the first SR-IOV adapter may be carried out by the hypervisor (136) storing configuration information for the first SR-IOV adapter, and for each of the SR-IOV adapters, in a non-volatile memory area, such as the flash memory (134). Further, while in the error state, if changes are made to the first SR-IOV partition, similar changes may be propagated to the configuration information in the adjunct so that when migration is completed, the changes made will be reflected in the second SR-IOV partition.

Instantiating (404) the second adjunct partition for the second SR-IOV adapter may be carried out by the hypervisor (136) instantiating a virtual machine to be the second adjunct partition, where the second adjunct partition is created with a device driver that is mapped to the physical function of the second SR-IOV adapter.

Configuring (406) the second SR-IOV adapter with the configuration of the first SR-IOV adapter may be carried out by the hypervisor (136) or the second adjunct partition, communicating with the physical function of the second SR-IOV adapter to copy settings and parameters from the first SR-IOV adapter into the second SR-IOV adapter.

Figure 5:
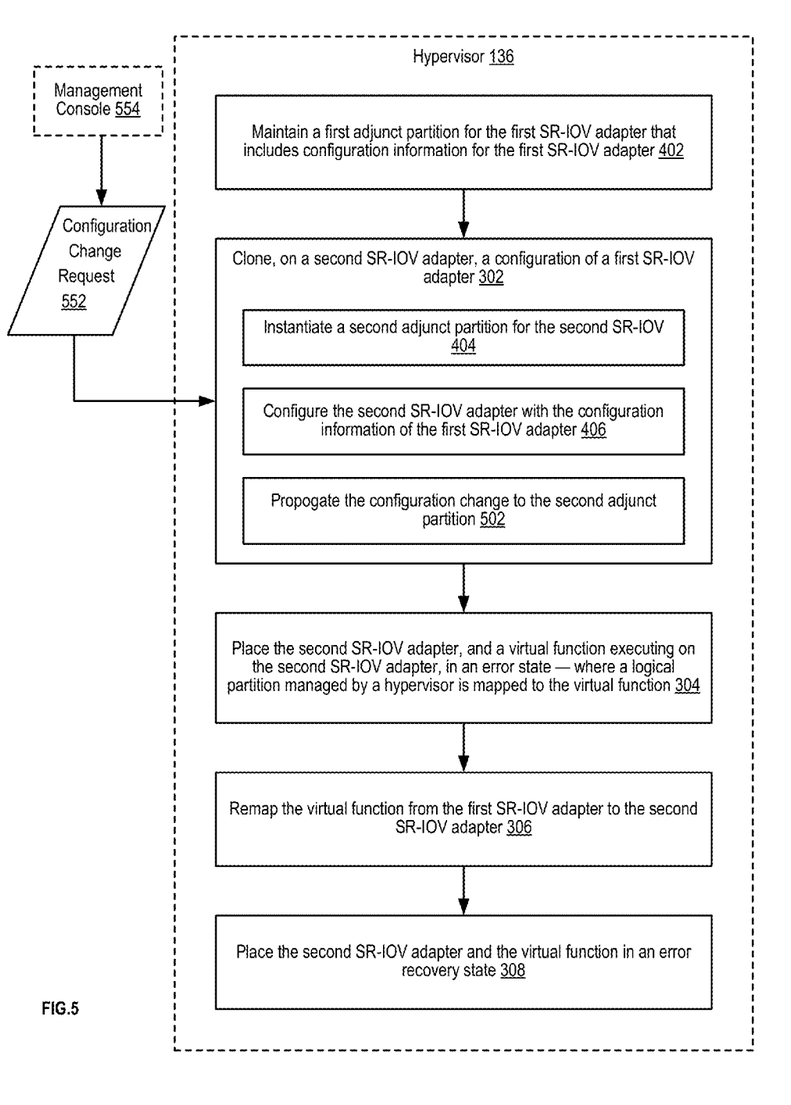
FIG. 5 depicts a flow chart illustrating an embodiment of a method for migrating an SR-IOV adapter configuration in a computing environment.

Turning now to FIG. 5, the method of FIG. 5 is similar to the method of FIG. 3 in that the method of FIG. 5 includes: cloning (302), on a second SR-IOV adapter, a configuration of the first SR-IOV adapter; placing (304) the second SR-IOV adapter and the virtual function in an error state; remapping (306) the virtual function from the first SR-IOV adapter to the second SR-IOV adapter; and placing (308) the second SR-IOV adapter and the virtual function in an error recovery state.

However, the method of FIG. 5 differs from the method of FIG. 3 in that the method of FIG. 5, where the cloning (302), on the second SR-IOV adapter, the configuration of the first SR-IOV adapter, further includes responding to a configuration change request (552), where the configuration change request (552) may be received from a management console (554) during cloning, and where the cloning (302) may include propagating (502) the configuration change request (552) to the second adjunct partition.

Propagating (502) the configuration change request (552) may be carried out by the hypervisor (136) receiving the configuration change request (552) from the management console (554), and providing the configuration change request (552) to the instantiated second adjunct partition, where the second adjunct partition, in response to receiving the configuration change request (552), may communicate with the physical function on the second SR-IOV adapter to set or copy any configuration changes intended for the first SR-IOV adapter into the second SR-IOV adapter.

Figure 6:
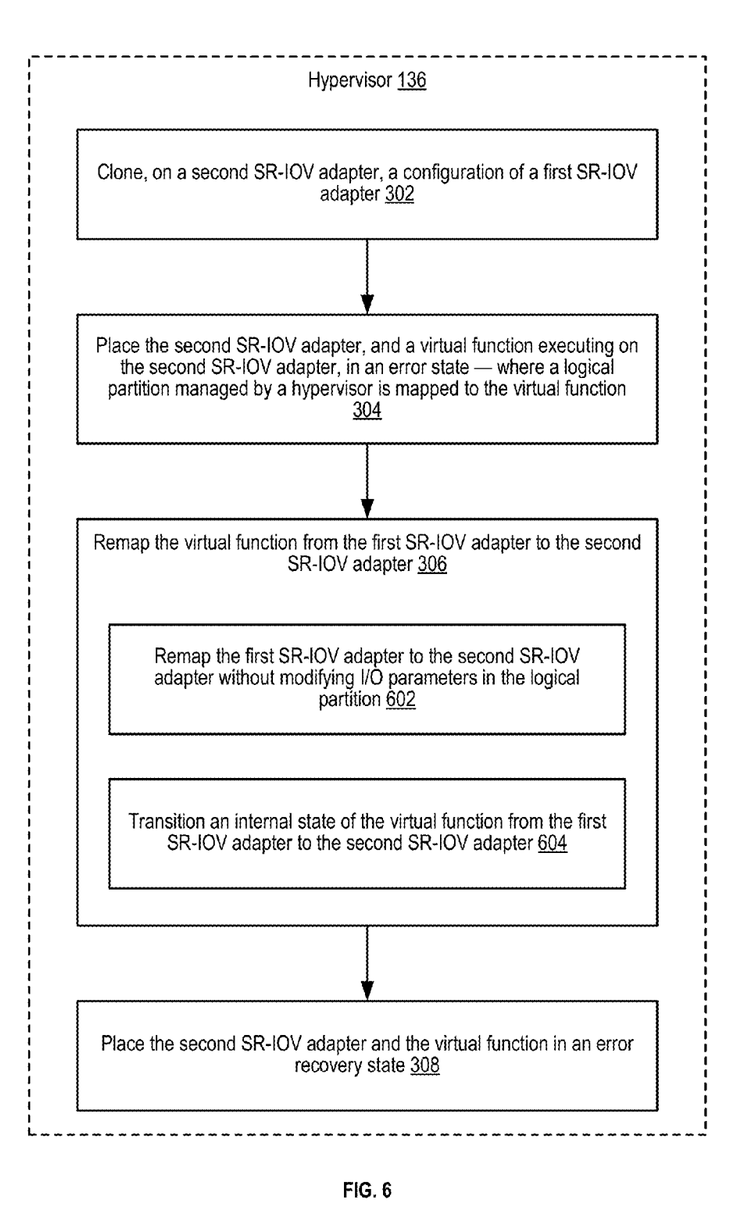
FIG. 6 depicts a flow chart illustrating an embodiment of a method for migrating an SR-IOV adapter configuration in a computing environment.

Turning to FIG. 6, the method of FIG. 6 is similar to the method of FIG. 3 in that the method of FIG. 6 includes: cloning (302), on a second SR-IOV adapter, a configuration of the first SR-IOV adapter; placing (304) the second SR-IOV adapter and the virtual function in an error state; remapping (306) the virtual function from the first SR-IOV adapter to the second SR-IOV adapter; and placing (308) the second SR-IOV adapter and the virtual function in an error recovery state.

However, the method of FIG. 6 differs from the method of FIG. 3 in that the method of FIG. 6 specifies that remapping (306) the virtual function from the first SR-IOV adapter to the second SR-IOV adapter includes: remapping (602) the first SR-IOV adapter to the second SR-IOV adapter without modifying I/O parameters in the logical partition; and transitioning (604) an internal state of the virtual function from the first SR-IOV adapter to the second SR-IOV adapter.

Remapping (602) the first SR-IOV adapter to the second SR-IOV adapter without modifying I/O parameters in the logical partition may be carried out by the hypervisor (136) performing remapping changes while the logical partition and virtual function is in the error state. In other words, before entering the error state, the logical partition may communicate with the virtual function executing on the first SR-IOV adapter, and after resuming normal operation after exiting the error state, the logical partition may continue to communicate with the virtual function, with no awareness or indication that the virtual function is now operating on a different SR-IOV adapter. As discussed above, this lack of awareness, and hence, lack of modification by the logical partition of any I/O parameters for communicating with the virtual function is due to the hypervisor (136) remapping the virtual function while the logical partition is suspended in an error state—where the remapping operations include: migrating interrupts from one PCIe slot to another PCIe slot, migrating DMA space from one PCIe slot to another PCIe slot, and migrating MMIO mappings from one PCIe slot to another PCIe slot, among others.

Transitioning (604) an internal state of the virtual function from the first SR-IOV adapter to the second SR-IOV adapter may be carried out by the hypervisor (136), or an adjunct partition created for and associated with the second SR-IOV adapter, migrating or copying the execution state of the virtual function, including queues, register values, memory values, and other settings and parameters specifying an execution state, from the first SR-IOV adapter to the second SR-IOV adapter.

Figure 7:
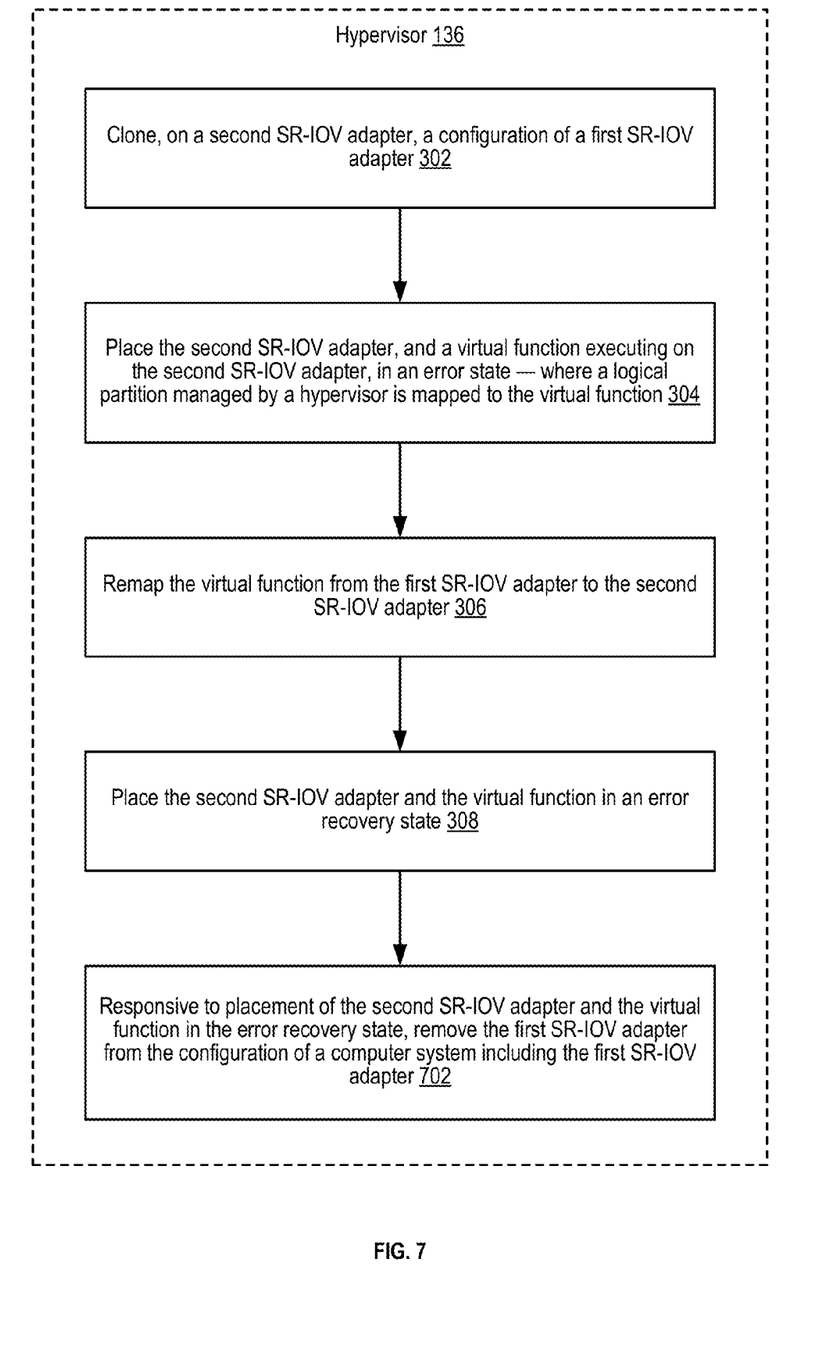
FIG. 7 depicts a flow chart illustrating an embodiment of a method for migrating an SR-IOV adapter configuration in a computing environment.

Turning to FIG. 7, the method of FIG. 7 is similar to the method of FIG. 3 in that the method of FIG. 7 includes: cloning (302), on a second SR-IOV adapter, a configuration of the first SR-IOV adapter; placing (304) the second SR-IOV adapter and the virtual function in an error state; remapping (306) the virtual function from the first SR-IOV adapter to the second SR-IOV adapter; and placing (308) the second SR-IOV adapter and the virtual function in an error recovery state.

However, the method of FIG. 7 differs from the method of FIG. 3 in that the method of FIG. 7 includes: responsive to the placement of the second SR-IOV adapter and the virtual function in the error state, removing (702) the first SR-IOV adapter from the configuration of a computer system that includes the first SR-IOV adapter.

Removing (702) the first SR-IOV adapter from the configuration of the computer system may be carried out by the hypervisor (136) accessing a stored configuration file that includes configuration information for the first SR-IOV adapter, and deleting the configuration information for the first SR-IOV adapter. For example, the configuration file may be stored in non-volatile memory, for example, the flash memory (134) of the computer system (102).

Figure 8:
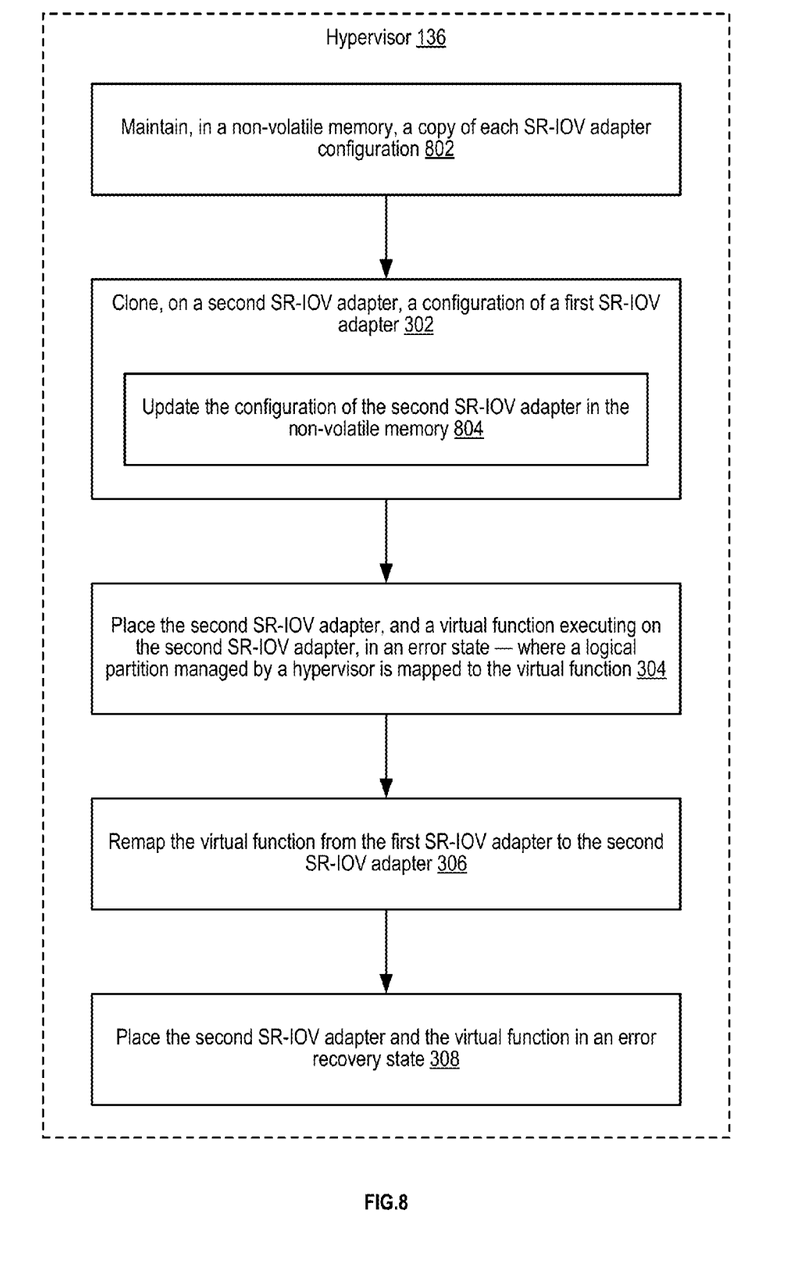
FIG. 8 depicts a flow chart illustrating an embodiment of a method for migrating an SR-IOV adapter configuration in a computing environment.

Turning to FIG. 8, the method of FIG. 8 is similar to the method of FIG. 3 in that the method of FIG. 8 includes: cloning (302), on a second SR-IOV adapter, a configuration of the first SR-IOV adapter; placing (304) the second SR-IOV adapter and the virtual function in an error state; remapping (306) the virtual function from the first SR-IOV adapter to the second SR-IOV adapter; and placing (308) the second SR-IOV adapter and the virtual function in an error recovery state.

However, the method of FIG. 8 differs from the method of FIG. 3 in that the method of FIG. 8 includes: maintaining (802), in a non-volatile memory, a copy of each SR-IOV adapter configuration; and where the cloning (302), on a second SR-IOV adapter, a configuration of the first SR-IOV adapter further includes updating (804) the configuration of the second SR-IOV adapter in the non-volatile memory.

Maintaining (802) a copy of each SR-IOV adapter configuration in a non-volatile memory may be carried out by the hypervisor writing, or burning, the flash memory (134) with configuration information received from a management console directed to a given SR-IOV adapter, including any configuration information updates after creating initial configuration data for the given SR-IOV adapter.

Updating (804) the configuration of the second SR-IOV adapter in the non-volatile memory may be carried out by the hypervisor (136) writing, or burning, the updated configuration information associated with the cloning of the first SR-IOV adapter onto the second SR-IOV adapter into the flash memory (134) of the computer system (102).

The disclosed embodiments are described largely in the context of a fully functional computer system for migrating an SR-IOV adapter configuration in a computing environment. Readers of skill in the art will recognize, however, that the disclosed embodiments may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the disclosed methods as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

The disclosed embodiments for migrating an SR-IOV adapter configuration in a computing environment may be a system, a method, and/or a computer program product. The computer program product may include a computer readable storage medium (or media) having computer readable program instructions thereon for causing a processor to carry out features and aspects of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform features and aspects of the disclosed embodiments.

The disclosed embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method of migrating an SR-IOV (single root input/output virtualization) adapter configuration in a computing system, wherein the method comprises:
   cloning, on a second SR-IOV adapter, a configuration of a first SR-IOV adapter, wherein the first SR-IOV adapter and the second SR-IOV adapter are among a plurality of SR-IOV adapters on the computing system, wherein the computing system further comprises a plurality of logical partitions and a hypervisor supporting the plurality of logical partitions, and wherein at least one of the logical partitions is mapped to a virtual function on the first SR-IOV adapter of the plurality of SR-IOV adapters;
   placing the second SR-IOV adapter and the virtual function in an error state, wherein placing the second SR-IOV adapter and the virtual function in an error state comprises informing the virtual function and the logical partition mapped to the virtual function to suspend operation;
   remapping the virtual function from the first SR-IOV adapter to the second SR-IOV adapter; and
   placing the second SR-IOV adapter and the virtual function in an error recovery state.

2. The method of claim 1, wherein:
   the hypervisor maintains a first adjunct partition for the first SR-IOV adapter that includes configuration information for the first SR-IOV adapter; and
   cloning, on the second SR-IOV adapter, the configuration of the first SR-IOV adapter further comprises:
       instantiating, by the hypervisor, a second adjunct partition for the second SR-IOV adapter; and
       configuring the second adjunct partition with the configuration information of the first adjunct partition.

3. The method of claim 2, wherein subsequent to recovering from the error recovery state, the logical partition communicates with the virtual function executing on the second SR-IOV adapter.

4. The method of claim 2, further comprising:
   receiving a configuration change request to the first SR-IOV adapter prior to placing the second SR-IOV adapter and the virtual function in the error recovery state; and
   propagating the configuration change to the second adjunct partition.

5. The method of claim 1, wherein remapping the virtual function from the first SR-IOV adapter to the second SR-IOV adapter further comprises:
   remapping the first SR-IOV adapter to the second SR-IOV adapter without modifying I/O parameters in the logical partition; and
   transitioning an internal state of the virtual function from the first SR-IOV adapter to the second SR-IOV adapter.

6. The method of claim 1, further comprising:
   responsive to placing the second SR-IOV adapter and the virtual function in the error recovery state, removing the first SR-IOV adapter from the configuration of the computing system.

7. The method of claim 1, further comprising:
   maintaining, in a non-volatile memory, a copy of each SR-IOV adapter configuration, wherein cloning the configuration of the first SR-IOV adapter on the second SR-IOV adapter further comprises:
       updating the configuration of the second SR-IOV adapter in the non-volatile memory.

8. An apparatus for migrating an SR-IOV adapter configuration in a computing environment, wherein the apparatus comprises a computer processor, a plurality of SR-IOV adapters, and a non-transitory computer memory operatively coupled to the computer processor, wherein the non-transitory computer memory has disposed within it computer program instructions that, when executed by the computer processor cause the apparatus to carry out:
   cloning, on a second SR-IOV adapter, a configuration of the first SR-IOV adapter, wherein the first SR-IOV adapter and the second SR-IOV adapter are among the plurality of SR-IOV adapters on the apparatus, wherein the apparatus further comprises a plurality of logical partitions and a hypervisor supporting the plurality of logical partitions, and wherein at least one of the logical partitions is mapped to a virtual function on the first SR-IOV adapter of the plurality of SR-IOV adapters;
   placing the second SR-IOV adapter and the virtual function in an error state wherein placing the second SR-IOV adapter and the virtual function in an error state comprises informing the virtual function and the logical partition mapped to the virtual function to suspend operation;
   remapping the virtual function from the first SR-IOV adapter to the second SR-IOV adapter; and
   placing the second SR-IOV adapter and the virtual function in an error recovery state.

9. The apparatus of claim 8, wherein:
   the hypervisor maintains a first adjunct partition for the first SR-IOV adapter that includes configuration information for the first SR-IOV adapter; and
   cloning, on the second SR-IOV adapter, the configuration of the first SR-IOV adapter further comprises:
       instantiating, by the hypervisor, a second adjunct partition for the second SR-IOV adapter; and
       configuring the second adjunct partition with the configuration information of the first adjunct partition.

10. The apparatus of claim 9, wherein subsequent to recovering from the error recovery state, the logical partition communicates with the virtual function executing on the second SR-IOV adapter.

11. The apparatus of claim 9, further comprising:
receiving a configuration change request to the first SR-IOV adapter prior to placing the second SR-IOV adapter and the virtual function in the error recovery state; and
propagating the configuration change to the second adjunct partition.

12. The apparatus of claim 8, wherein remapping the virtual function from the first SR-IOV adapter to the second SR-IOV adapter further comprises:
remapping the first SR-IOV adapter to the second SR-IOV adapter without modifying I/O parameters in the logical partition; and
transitioning an internal state of the virtual function from the first SR-IOV adapter to the second SR-IOV adapter.

13. The apparatus of claim 8, wherein the steps further comprise:
responsive to placing the second SR-IOV adapter and the virtual function in the error recovery state, removing the first SR-IOV adapter from the configuration of the computing system.

14. The apparatus of claim 8, wherein the steps further comprise:
maintaining, in a non-volatile memory, a copy of each SR-IOV adapter configuration, wherein cloning the configuration of the first SR-IOV adapter on the second SR-IOV adapter further comprises:
updating the configuration of the second SR-IOV adapter in the non-volatile memory.

15. A computer program product disposed upon a non-transitory, computer-readable medium, the computer program product comprising computer program instructions that, when executed, cause a computer to carry out:
cloning, on a second SR-IOV adapter, a configuration of a first SR-IOV adapter, wherein the computer comprises a plurality of SR-IOV adapters that include the first SR-IOV adapter and the second SR-IOV adapter, wherein the computer further comprises a hypervisor supporting a plurality of logical partitions, and wherein at least one of the logical partitions is mapped to a virtual function on the first SR-IOV adapter;
placing the second SR-IOV adapter and the virtual function in an error state, wherein placing the second SR-IOV adapter and the virtual function in an error state comprises informing the virtual function and the logical partition mapped to the virtual function to suspend operation;
remapping the virtual function from the first SR-IOV adapter to the second SR-IOV adapter; and
placing the second SR-IOV adapter and the virtual function in an error recovery state.

16. The computer program product of claim 15, wherein:
the hypervisor maintains a first adjunct partition for the first SR-IOV adapter that includes configuration information for the first SR-IOV adapter; and
cloning, on the second SR-IOV adapter, the configuration of the first SR-IOV adapter further comprises:
instantiating, by the hypervisor, a second adjunct partition for the second SR-IOV adapter; and
configuring the second adjunct partition with the configuration information of the first adjunct partition.

17. The computer program product of claim 16, wherein the steps further comprise:
receiving a configuration change request to the first SR-IOV adapter prior to placing the second SR-IOV adapter and the virtual function in the error recovery state; and
propagating the configuration change to the second adjunct partition.

18. The computer program product of claim 15, wherein remapping the virtual function from the first SR-IOV adapter to the second SR-IOV adapter further comprises:
remapping the first SR-IOV adapter to the second SR-IOV adapter without modifying I/O parameters in the logical partition; and
transitioning an internal state of the virtual function from the first SR-IOV adapter to the second SR-IOV adapter.

19. The computer program product of claim 15, wherein the steps further comprise:
responsive to placing the second SR-IOV adapter and the virtual function in the error recovery state, removing the first SR-IOV adapter from the configuration of the computing system.

20. The computer program product of claim 15, wherein the steps further comprise:
maintaining, in a non-volatile memory, a copy of each SR-IOV adapter configuration, wherein cloning the configuration of the first SR-IOV adapter on the second SR-IOV adapter further comprises:
updating the configuration of the second SR-IOV adapter in the non-volatile memory.

* * * * *